United States Patent
Norys et al.

(10) Patent No.: US 12,190,559 B2
(45) Date of Patent: Jan. 7, 2025

(54) SYSTEM AND METHOD FOR PRIORITIZING SIMILARITIES AND DIFFERENCES DURING RESPONSES TO INCIDENTS BASED ON INCIDENT CONTEXT

(71) Applicant: MOTOROLA SOLUTIONS, INC., Chicago, IL (US)

(72) Inventors: Filip Norys, Chrzanow (PL); Sebastian Mroz, Cracow (PL); Krzysztof Lubas, Cracow (PL); Grzegorz Gosztyla, Cracow (PL); Pawel G Nowicki, Wegrzce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 361 days.

(21) Appl. No.: 17/933,128

(22) Filed: Sep. 19, 2022

(65) Prior Publication Data
US 2024/0096053 A1    Mar. 21, 2024

(51) Int. Cl.
| | | |
|---|---|---|
| G06K 9/00 | (2022.01) | |
| G06V 10/74 | (2022.01) | |
| G06V 10/776 | (2022.01) | |
| G06V 20/52 | (2022.01) | |
| G10L 25/51 | (2013.01) | |
| G06V 40/10 | (2022.01) | |
| G06V 40/20 | (2022.01) | |

(52) U.S. Cl.
CPC .......... *G06V 10/761* (2022.01); *G06V 10/776* (2022.01); *G06V 20/52* (2022.01); *G10L 25/51* (2013.01); *G06V 40/10* (2022.01); *G06V 40/20* (2022.01)

(58) Field of Classification Search
None
See application file for complete search history.

(56) References Cited

U.S. PATENT DOCUMENTS 8,200,011 B2    6/2012  Eaton et al.
9,820,120 B2 *  11/2017 deCharms ............... H04W 4/02
(Continued)

FOREIGN PATENT DOCUMENTS

KR    20150029006 A    3/2015
WO    2010077979 A2    7/2010

OTHER PUBLICATIONS

Haziq Igram Bin Mohammed Shafri, et al.: "Dynamic Video Analytics Rules based on Human Conversation", U.S. Appl. No. 17/446,627, filed Sep. 1, 2021, all pages.
(Continued)

*Primary Examiner* — Shervin K Nakhjavan (57) ABSTRACT

Techniques for prioritizing similarities and differences during responses to incidents based on incident context are provided. Video and audio of an initial response to a first incident at an incident location is monitored. A context for the initial response is created. Video and audio of a subsequent response to a second incident at the incident location is monitored. The video and audio of the initial response and the subsequent response is compared. A machine learning model prioritizes the similarities and differences between the video and audio based on the context. The similarities and differences between the video and audio are provided to a subsequent responder based on the prioritization.

20 Claims, 5 Drawing Sheets

(56) References Cited

U.S. PATENT DOCUMENTS

| | | |
|---|---|---|
| 10,354,141 B2 | 7/2019 | Spengler et al. |
| 10,388,132 B2 | 8/2019 | Cutcher et al. |
| 10,398,970 B2 | 9/2019 | Gault et al. |
| 10,459,827 B1 | 10/2019 | Aghdaie et al. |
| 11,589,289 B2* | 2/2023 | Frusina ................. H04W 40/34 |
| 2004/0223054 A1 | 11/2004 | Rotholtz |
| 2016/0180239 A1 | 6/2016 | Frankel et al. |
| 2023/0190100 A1* | 6/2023 | Stump .................... A61B 5/021 |
| | | 600/301 |
| 2023/0210372 A1* | 7/2023 | Alam ................... A61B 5/6898 |
| | | 340/286.07 |
| 2024/0046642 A1* | 2/2024 | Jorasch ................. G06V 40/10 |
| 2024/0298084 A9* | 9/2024 | Huang ................... H04N 23/66 |

OTHER PUBLICATIONS

Janusz Szuba, et al.: "Video-Based Public Safety Incident Prediction System and Method Therefor", U.S. Appl. No. 17/661,919, filed May 4, 2022, all pages.

* cited by examiner

SYSTEM AND METHOD FOR PRIORITIZING SIMILARITIES AND DIFFERENCES DURING RESPONSES TO INCIDENTS BASED ON INCIDENT CONTEXT

BACKGROUND

At least a portion of the responsibilities of public safety agencies is responding to calls for service. For example, in a law enforcement context, calls for service may come from calls to an emergency number (e.g. 911, 999, 112, etc.). A call for service may have a location, referred to as an incident location, where the request for service is needed. In many cases, a call for service results in one or more public safety officials (e.g. police officer, etc.) being dispatched to the incident location to respond to the call for service.

In some cases, the call for service may be a discrete event. For example, consider a 911 call to report a minor car accident. A police officer may be dispatched to the incident location, complete any necessary activities (e.g. gather parties contact information, fill out accident report, etc.), and then leave.

In some cases, there may be repeated calls for service at the same location. For example, consider the case of a residential address that has a history of calls for service related to domestic violence. The calls for service may be separated by various time periods (e.g. daily, monthly, etc.) such that the calls for service are not entirely predictable. As yet another example, consider calls for service related to a loud house party. A police officer may be dispatched multiple times to the same incident location if there are complaints by different people at different times. What should be understood is that in some cases, there may be multiple calls for service, occurring at different times, for the same location.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

As mentioned above, calls for service from the same incident location may arrive at a dispatch center requesting that a public safety official, such as a police officer, be dispatched to the location to address the call for service. The frequency of these repeated calls for service as well as the period between the calls for service may be unpredictable. In general, a public safety dispatcher will attempt to dispatch an officer that is most suitable for handling the call for service.

A problem arises in that it is not always possible to send the same police officer to respond to each call for service at the incident location. For example, the officer may be busy responding to a different call for service, the officer may be off duty, or the officer may be engaged in other activities making them unavailable to respond to the call for service. As such, this means that each time there is a call for service from a given location, there may be different officers responding to the call for service.

The problem that arises in that it is not possible for an officer to record and document every detail about the incident location that might be useful when handling subsequent responses to that location. For example, consider a domestic violence call for service where an officer responds to an incident location that is a living room (including furniture, such as a couch, that is generally not moved), with multiple people (including a person who appears slightly agitated). Depending on the circumstances, the officer may leave the incident location without taking any actions (e.g. arresting someone, etc.). If the level of agitation of the person was not sufficiently high, the characteristic might not be documented.

Assume that at some time later, another call for service is placed for the same location. Based on any number of factors, the officer assigned to respond to the call for service may be different than the one that responded to the initial call for service. Upon arrival, the incident location, the couch in the living room may have been moved to a different location. However, because the initial location of the couch is not the type of information that would have been recorded by the initially responding officer, the subsequent responding officer, even if they looked at the documentation from the initial officer, would have no idea that the couch had been moved. In some cases, this change could be indicative of a greater issue (e.g. couch was moved to cover blood stains, etc.). Because the subsequent responding officer was not involved in the initial call for service, they would have no ability to have knowledge of the rearrangement of the furniture.

Even if the same officer is assigned to the subsequent call for service, the problem may still arise. As mentioned above, the various calls for service may be spaced in time. For relatively unimportant details, such as the couch position, the officer may truly not remember the original position of the couch. This problem may be exacerbated by the fact that when the officer is originally sent to the initial request for service, their attention may be directed to more important concerns, such as verifying the safety of all participants, as opposed to noticing details about the furniture placement.

The techniques described herein resolve this problem and others. An initially responding officer may be wearing a camera, such as a body worn camera. When the officer responds to the incident scene, the video captured by the body worn camera (BWC) may be monitored. For example, video analytics may be run on the captured video to identify various details of the scene (e.g. number of participants, furniture layout, etc.). As the BWC video is analyzed via a machine, it is possible to capture details of the scene that are far beyond what a human being would be capable of noticing/documenting.

In addition to wearing a BWC, the initial officer may also have an audio communications device, such as a walkie-talkie or a cell phone. Audio communications of the officer may be similarly monitored using audio analytics. The analytics may be used to identify the type of incident that is occurring (e.g. domestic violence, noise complaint, etc.) as well as the behavior of people on the scene (e.g. yelling, crying, etc.).

The video and audio information may then be used to create a context for the initial response from the initial responder. For example, based on the video and audio, the context of the incident could be determined to be a domestic violence incident, a noise complaint incident, etc. The specific context of the incident is relatively unimportant, and the techniques described herein may be utilized for any context.

Upon a subsequent call for service at the same location, the subsequent responders video from a BWC and audio may also be monitored, just as with the initial responder. It should be understood that the subsequent responder need not be the same person as the initial responder.

The video from the BWC of both the initial response and the subsequent response may be compared to identify similarities and differences. Continuing with the example above, an identified difference may be that the couch in the living room has been moved. The same comparison process could occur for audio information. For example, if the initial response included audio of someone yelling, while the subsequent response included audio of someone crying.

A machine learning model may be used to prioritize the similarities and differences of the video and audio based on the context. For example, in the case of a noise complaint from a loud, rambunctious party, slight movement of the furniture might not be a very important detail. However, in a domestic assault case, movement of furniture may indicate that something is being covered up. What should be understood is that specific details of importance may be dependent upon the context of the call for service that is being responded to. The prioritized difference between the video and audio may then be presented to the subsequent first responder for further investigation.

In order to continuously improve, the subsequent first responder may provide feedback to the machine learning model that indicates if the prioritization was correct. For example, in the example, of the noise complaint, if the couch position was prioritized, the subsequent responder may provide feedback indicating that the prioritization was not correct. For example, the feedback indicating the prioritization was correct or not could be based on the fact that the provided similarities and differences were relevant to the incident or not. The feedback may then be incorporated into the machine learning model to aid in improving the model by providing additional training. Over a period of time, the machine learning model will become better at determining which similarities and differences are important based on the context of the incident.

A method is provided. The method includes monitoring, with a first body worn camera, video of an initial response to a first incident at an incident scene. The method also includes monitoring audio communications of at least one initial responder to the incident scene. The method also includes creating a context for the initial response based on the video from the first body worn camera and the audio communications of the at least one initial responder. The method also includes monitoring with a second body worn camera, video of a subsequent response to a second incident at the incident scene. The method also includes monitoring audio communications of at least one subsequent responder to the incident scene. The method also includes comparing the first and second body worn camera video to identify similarities and differences between the first and second body worn camera video. The method also includes comparing the audio communication of the at least one initial and subsequent responders to identify similarities and differences between the audio communication of the at least one initial and subsequent responders. The method also includes prioritizing, by a machine learning model, the similarities and differences between the video and audio based on the context. The method also includes providing the similarities and differences between the video and audio to the at least one subsequent responder based on the prioritization.

In one aspect, the method also includes receiving feedback from the at least one subsequent responder, the feedback indicating if the prioritization of the similarities and differences between the video and audio based on the context was correct and updating the machine learning model based on the feedback. In one aspect the feedback further includes feedback indicating if the provided similarities and differences were relevant. In one aspect the context includes at least one of type of incident, time between the initial and subsequent incidents, and type of responder.

In one aspect the similarities and differences include at least one of number of incident participants, identities of incident participants, and behavior of incident participants. In one aspect the similarities and differences include at least one of physical items present at the incident scene and location of physical items at the incident scene. In one aspect the first body worn camera and the second body worn camera are the same camera and the at least one initial responder and the at least one subsequent responder are the same responder.

A system is provided. The system includes a processor and a memory coupled to the processor. The memory contains a set of instructions thereon that when executed by the processor causes the processor to monitor, with a first body worn camera, video of an initial response to a first incident at an incident scene. The instructions further cause the processor to monitor audio communications of at least one initial responder to the incident scene. The instructions further cause the processor to create a context for the initial response based on the video from the first body worn camera and the audio communications of the at least one initial responder. The instructions further cause the processor to monitor with a second body worn camera, video of a subsequent response to a second incident at the incident scene. The instructions further cause the processor to monitor audio communications of at least one subsequent responder to the incident scene. The instructions further cause the processor to compare the first and second body worn camera video to identify similarities and differences between the first and second body worn camera video. The instructions further cause the processor to compare the audio communication of the at least one initial and subsequent responders to identify similarities and differences between the audio communication of the at least one initial and subsequent responders. The instructions further cause the processor to prioritize, by a machine learning model, the similarities and differences between the video and audio based on the context. The instructions further cause the processor to provide the similarities and differences between the video and audio to the at least one subsequent responder based on the prioritization.

In one aspect the system further comprises instructions to receive feedback from the at least one subsequent responder, the feedback indicating if the prioritization of the similarities and differences between the video and audio based on the context was correct and update the machine learning model based on the feedback. In one aspect of the system, the feedback further includes feedback indicating if the provided similarities and differences were relevant. In one aspect of the system, the context includes at least one of type of incident, time between the initial and subsequent incidents, and type of responder.

In one aspect of the system, the similarities and differences include at least one of number of incident participants, identities of incident participants, and behavior of incident participants. In one aspect of the system, the similarities and differences include at least one of physical items present at the incident scene and location of physical items at the incident scene. In one aspect of the system, the first body worn camera and the second body worn camera are the same camera and the at least one initial responder and the at least one subsequent responder are the same responder.

A non-transitory processor readable medium containing a set of instructions thereon is provided. The instructions on the medium cause the processor to monitor, with a first body worn camera, video of an initial response to a first incident at an incident scene. The instructions on the medium also cause the processor to monitor audio communications of at least one initial responder to the incident scene. The instructions on the medium also cause the processor to create a context for the initial response based on the video from the first body worn camera and the audio communications of the at least one initial responder. The instructions on the medium also cause the processor to monitor with a second body worn camera, video of a subsequent response to a second incident at the incident scene. The instructions on the medium also cause the processor to monitor audio communications of at least one subsequent responder to the incident scene. The instructions on the medium also cause the processor to compare the first and second body worn camera video to identify similarities and differences between the first and second body worn camera video. The instructions on the medium also cause the processor to compare the audio communication of the at least one initial and subsequent responders to identify similarities and differences between the audio communication of the at least one initial and subsequent responders. The instructions on the medium also cause the processor to prioritize, by a machine learning model, the similarities and differences between the video and audio based on the context. The instructions on the medium also cause the processor to provide the similarities and differences between the video and audio to the at least one subsequent responder based on the prioritization.

In one aspect the medium further comprises instructions to receive feedback from the at least one subsequent responder, the feedback indicating if the prioritization of the similarities and differences between the video and audio based on the context was correct and update the machine learning model based on the feedback. In one aspect of the medium, the feedback further includes feedback indicating if the provided similarities and differences were relevant. In one aspect of the medium, the context includes at least one of type of incident, time between the initial and subsequent incidents, and type of responder.

In one aspect of the medium, the similarities and differences include at least one of number of incident participants, identities of incident participants, and behavior of incident participants. In one aspect of the medium, the similarities and differences include at least one of physical items present at the incident scene and location of physical items at the incident scene.

Further advantages and features consistent with this disclosure will be set forth in the following detailed description, with reference to the figures.

Figure 1:
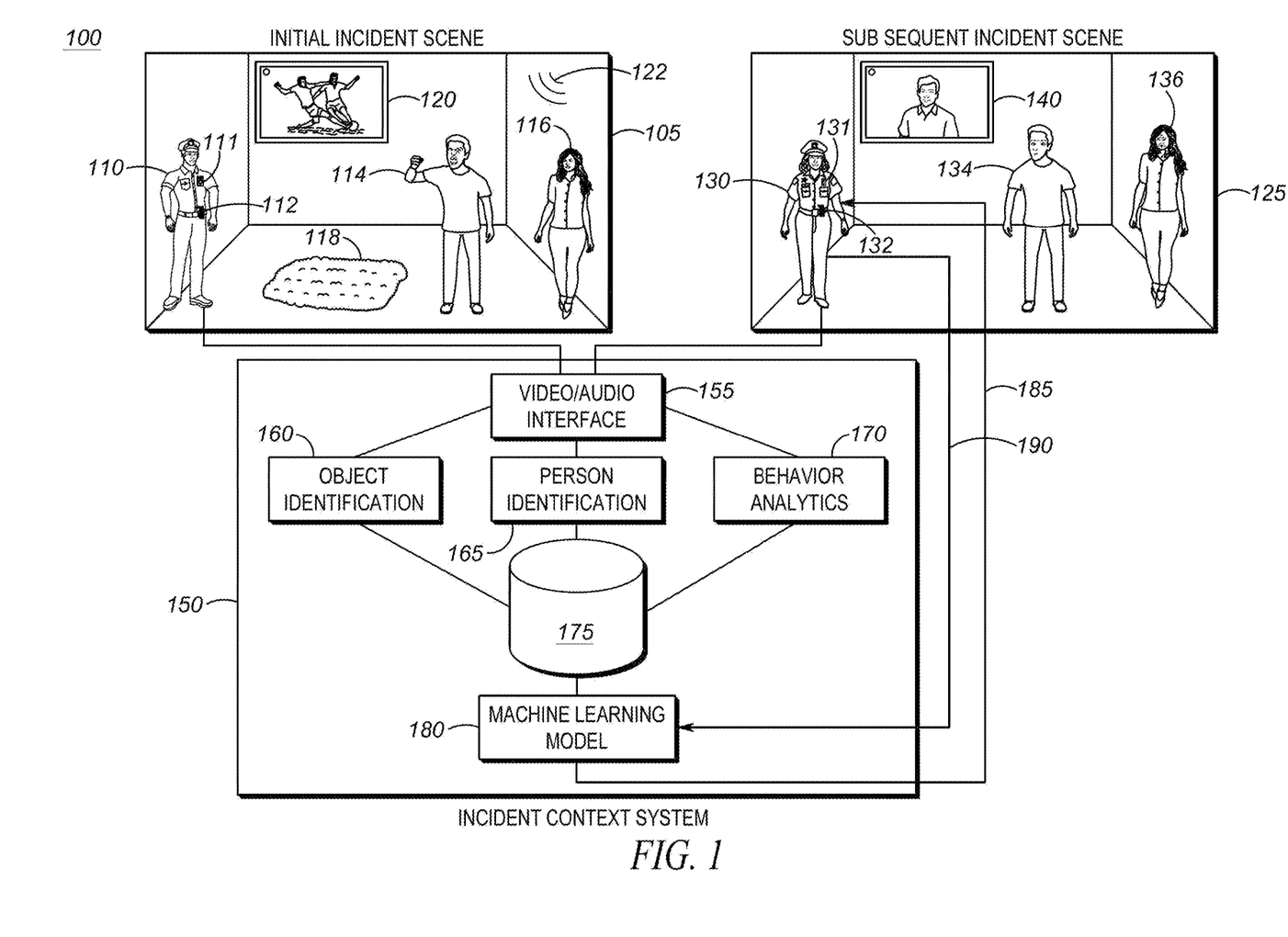
FIG. 1 is an example of an environment in which the techniques described herein may be implemented.

FIG. 1 is an example of an environment 100 in which the techniques described herein may be implemented. Environment 100 may include an initial incident scene 105. The initial incident scene may, for example, depict a location for which a request for service has been received. For purposes of this description, assume that the initial incident scene 105 is the first time there has been a request for service at this location. Furthermore, assume that initially, there is no information related to the type of incident for which service from public safety officials is being requested.

Initial incident scene 105 may include an initial responder 110 who is providing the initial response to the request for service. In this example, the initial responder 110 may be a police officer. The initial responder 110 may be equipped with a video recording device, such as a body worn camera 111. The body worn camera 111 may be capable of sending recorded video to incident context system 150. The initial responder 110 may also be equipped with an audio communication device, such as a walkie-talkie 112. The walkie-talkie 112 may also be capable of sending audio to the incident context system 150. Operation of the incident context system 150 will be described in further detail below. Furthermore, although video and audio is shown as being captured by separate devices, it should be understood that the functionality may be combined into a single device (e.g. smartphone, etc.). What should be understood is that both audio and video may be sent to the backend incident context system for analysis and processing.

Initial incident scene 105 may also include a first subject 114. In this example, the first subject 114 is a male. Based on behavior analytics (described below), it may be determined that the first subject 114 is in an agitated state, having an aggressive demeanor. Initial incident scene 105 may also include a second subject 116. In this example, the second subject 116 is a female. Based on behavioral analytics, it may be determined that the second subject 116 is in a passive state, having a quiet demeanor.

The initial incident scene 105 may also include various other items. For example, there may be a rug 118 within the initial incident scene 105. A rug 118 is the type of item within an incident scene that would not be expected to move. The initial incident scene 105 may also include a television 120. In this particular example, the television may be displaying a sporting event, such as a soccer game.

The initial incident scene 105 may also include elements that are not physical. For example, there may be background noises 122. For this example, assume that background noises 122 include a child crying. The sounds of the child crying may be coming from a different room that is not depicted in initial incident scene 105.

Environment 100 may also include a subsequent incident scene 125. Subsequent incident scene 125 may be the same as incident scene 105, but at a later time. For example, after the initial response for a call for service at the initial incident scene 105 has been completed, there may be a subsequent request for service at the same location. Subsequent incident scene 125 depicts the location during the subsequent request for service.

Subsequent incident scene 125 may include a subsequent responder 130 that is responding to the subsequent request for service. In this example, subsequent responder 130 may be a police officer. In this example, subsequent responder 130 is shown as being a different person than the initial responder 110. However, this is simply for purposes of explanation. In some cases, the subsequent responder 130 may be the same as the initial responder 110. The techniques described herein are applicable in either case. Subsequent responder 130 may also be equipped with a body worn camera 131 and an audio communications device 132, similar to initial responder 110.

Subsequent incident 125 scene may also include a first subject 134. As will be explained in further detail below, the incident context system 150 may be able to determine that first subject 134 is the same person as first subject 114. In the subsequent incident scene 125, the first subject 134 may now have a scared demeanor as determined by behavioral analytics. Subsequent incident scene 125 may also include a second subject 136. The incident context system 150 may determine that second subject 136 is the same person as second subject 116. In the subsequent incident scene 125, the second subject 136 may be crying.

The subsequent incident scene 125 may also include a television 140. The television 140 may be the same as television 120, but in the subsequent incident scene 125 the television 140 may be displaying a news program. What should also be noted is that there is no equivalent of a rug 118 in the subsequent incident scene. There is also no sound 122 (e.g. crying child, etc.) in the subsequent incident scene 125. The significance of the absence of those elements will be described in further detail below.

The environment 100 may also include incident context system 150. Incident context system 150 may be responsible for implementing the techniques described herein. An example of a hardware device that may implement the incident context system 150 is described with respect to FIG. 4.

Incident context system 150 may include a video/audio interface 155 through which the incident context system may communicate with the video capture devices 111, 131 and audio capture devices 112, 132 that are at the incident location. In some cases, the video and/or audio may be transmitted in real time to the video/audio interface 155 (e.g. via wireless connection, etc.) while in other cases the video and/or audio may be sent to the incident context system 150 in an offline process (e.g. when the responder returns to the station, etc.). What should be understood is that the video and audio collected at the incident location is received by the incident context system 150.

The received video and audio may be passed to any number of analytic modules. For example, the incident context system 150 may include an object identification analytic 160. The object identification analytic may be used to identify objects that are present at the initial incident scene 105 or subsequent incident scene 125. In terms of the present example, objects that may be detected could include the rug 118 or the television 120,140. There are many different type of object detection analytics that are currently available, many of them based on machine learning techniques. The techniques described herein are usable with any currently known or later developed object detection techniques. The object identification analytic 160 may pass any detected objects, including the time at which the object was detected to a storage system 175. Use of detected objects will be described in further detail below.

Incident context system 150 may also include a person identification analytic 165. The person identification analytic 165 may be used to identify persons at the initial 105 and subsequent 125 incident scenes. In some cases, the person identification analytic 165 may personally identify persons (e.g. by name, etc.). In other case, the person identification system may simply determine that the same person was present in the initial 105 and subsequent 125 incident scenes. The person identification analytic 165 may also determine the number of persons and the types of persons (e.g. police officer, firefighter, civilian, etc.) that are located at the incident scene. The identification of persons, along with the times they are present at the incident scene may be sent to the storage system 175 for later use. There are many known techniques for identifying persons in a scene. The techniques described herein are usable with any currently known or later developed techniques for person identification. Use of identified persons will be described in further detail below.

Incident context system 150 may also include behavior analytics 170. Behavior analytics 170 may be used to analyze the behavior of persons captured by body worn camera 111,131 to detect the state of those persons. For example, behavior analytics 170 may be used to detect if a person is angry, sad, crying, scared, agitated, quiet, etc. There are many known behavior analytics techniques that may be used to identify human behaviors. The techniques described herein are usable with any currently existing or later developed behavior analytics techniques. Just as above, the results of the behavior analytics 170, including times, may be sent to the storage system 175. Use of identified behaviors will be described in further detail below.

Although several examples of techniques used to monitor the video and audio are presented (e.g. object identification 160, person identification 165, and behavior analytics 170), it should be understood that these are merely examples. The techniques described herein could make use of any capability of analyzing a scene to extract contextual information that is currently available or developed in the future. What should be understood is that details related to the incident scene are extracted and used to generate a context of the incident and will later be used to identify similarities and differences between responses to requests for service at the same location.

Incident context system 150 may also include machine learning model 180. Machine learning model may take as an input, the various pieces of information stored in the storage system, such as object identification, person identification, behavior analysis, etc. to build a context for the incident. Although not shown, the storage system 175 may also include incident metadata related to the incident obtained for other systems, such as computer aided dispatch systems, etc.

Building a context for an incident can include identifying different pieces of information related to the incident in order to establish an overall picture of the incident. Information can include the number and type of public safety personnel dispatched to the incident. For example, incidents which had law enforcement dispatched may have a different context than those which had a fire department response. Context may also include the type of incident. A request for assistance related to a domestic violence situation is likely different than a request for assistance related to a noise complaint.

Context may include the time elapsed between requests for service at a given location. For example, two requests for service at the same location within hours of each other are much more likely to be related than two requests for service separated by years. Other information may include if the incident location is on public or private property. For example, if the location is a public establishment, such as a bar, even if the incident types may be related, it is possible that it is an entirely different set of people involved, whereas if the incident type is a private location, it is more likely that it is the same set of individuals (e.g. people who live at the location, etc.)

Context may include audio communications from the first responders. For example, during the response, there may be requests for backup due to incident escalation. Such information may be useful in determining that previous incidents at the same location resulted in escalation of a response. The context may also include things such as the type of equipment previously used by first responders. For example, if anti-overdoes medication was used in previous responses. In addition, the context may include historical feedback from first responders related to previous requests for service at the location.

The machine learning model 180 may then process the information received from the responders to identify similarities and differences between a current incident response and a previous incident response at the same location that have the same context. For example, the machine learning model 180 may receive video and/or audio input 155 from the subsequent incident scene and determine that the context of the subsequent incident scene 125 is similar to the initial incident scene 105. The machine learning model may then identify similarities and differences between the two responses (e.g. people present, sounds, items missing, etc.). Once similarities and differences have been identified, they may be prioritized based on the context of the incident. For example, some incident types certain similarities and differences may be important whereas for other types the similarities or differences may be irrelevant.

The prioritized similarities and differences may then be sent to the responding officer. They may be sent to the responding officer via a communication device 132, a mobile terminal (not shown), smart glasses, virtual assistants, or any other mechanism for communicating such information to the responding officer. The similarities and differences may be conveyed directly (e.g. rug that was previously present is missing, etc.) or as suggestions (e.g. investigate why the rug is missing).

The machine learning model 180 may then receive feedback from the responding officer that indicates if the information provided was helpful. For example, if the information provided was not relevant to a particular incident context, the feedback may indicate that the prioritization of that information was too high. In addition, if it is discovered that there are differences that were important, but were not provided to the responding officer, the feedback may indicate the prioritization was too low. The machine learning model 180 may then use the feedback to at least partially retrain the model such that future recommendations are improved based on the feedback.

It should be understood that the machine learning model 180 may use any currently available machine learning techniques, and the techniques described herein are not limited to any particular implementation. The techniques described herein would also be usable with any later developed machine learning techniques. Using feedback from system users to partially and or fully train machine learning models is a technique that would be known to a person of skill in the art.

The operation of incident context system 150 may be better understood by way of the following example scenario. In the example scenario, assume that there is a request for service related to a domestic violence incident at the initial incident scene 105. For purposes of this example only, assume that this is the first time there has been a request for service at this particular location. However, it should be understood that this is for ease of description only and not by way of limitation.

In operation, a request for service at initial incident scene 105 may be received. For example, the request for service may be related to a domestic violence incident. An initial responder 110 may be dispatched to handle the domestic violence related request for service at the initial incident scene 105. The type of incident, the responder type and number, and the time of the incident may be logged in the storage system 175.

Upon arrival at the initial incident scene 105, the body worn camera 111 of the initial responder may begin recording the initial incident scene 105. This recording may be sent to the incident context system 150 for analysis. In some cases, the recording may be sent in real time over a wireless communication link, while in other cases, the recoding may be sent at a later time (e.g. when the officer returns to the station, etc.).

Upon receipt of the recording, the incident context system 150 may begin to create a context for this incident. As explained above, since this is the first time there has been a request for service at this location, there may be no history of an previous response to this location. Creating the context for the incident may include using object identification system 160 to identify that there is a rug 118 at the location and there is a television 120 that is playing a sporting event. The person identification system 165 may identify that there are two subjects at the location. The first subject 114 may be a male while the second subject 116 may be a female.

The behavioral analytics 170 may be used to identify behavioral characteristics of the two subjects. For example, the first subject 114 may be identified as having an aggressive demeanor, based on visual characteristics (e.g. posture, facial expression, etc.). The second subject 116 may be identified as having a quiet demeanor. In addition, audio characteristics of the initial incident scene 105 may be monitored. In this example, the audio may indicate the presence of a crying child 122 that is not visible in the initial incident scene. All of these determined pieces of information may be stored in the storage system 175 for later use. As this is assumed to be the first time that there has been a request for service at this location, the incident context system 150 does not offer any information to the initial responder 110.

At some later time, there may be a subsequent request for assistance at the same incident location, for a similar incident type (e.g. domestic violence, etc.). A subsequent responder 130, that is different from the initial responder 110, may be dispatched to the subsequent incident scene 125 to respond to the request for service. As should be clear, there is no time constraint between the initial and subsequent requests for service. The requests for service may come within minutes, hours, days, weeks, months, etc. of each other. Furthermore, although the example is presented in terms of the initial response having been the first time there has been a request for service at the location, the techniques are not so limited. What should be understood is that all information related to calls for service at the location may be utilized.

Although in this example, the subsequent responder 130 is different from the initial responder 110, this is for ease of description only. In some responses, the two responders may be the same person. However, if enough time has passed between incident responses, by the nature of human limitation, the initial responder may not be able to remember the details of the previous response. Thus the techniques described herein are usable with either the same of different responders.

Upon arrival of the subsequent responder 131 at the subsequent incident location, a similar process with respect to the initial responder occurs. The body worn camera of the subsequent responder begins capturing video and providing it to the incident context system 150 for analysis and generation of context. The incident context system 150 may determine that the subsequent request for service is also for a domestic violence incident.

The object identification system 160 may identify that there is a television 140 in the room that is displaying a news program. It should be noted that because the subsequent incident scene 125 does not include the rug, the object identification system is not able to detect a rug. The person identification system 165 may identify that there are two subjects, first subject 134 and second subject 136. The person identification system 165 may be able to compare the first subject 134 to the first subject 114 to determine they are the same person. The same can occur for the second subject 136 and second subject 136. The behavioral analytics 170 may determine that the first subject 134 appears scared, while the second subject 136 is now crying.

The incident context system 150 may then begin comparing the details from the initial 105 and subsequent incident scenes 125 to identify similarities and differences between the two incident scenes. Some example similarities can include: the same people (e.g. first subject 114,134 and second subject 116, 136) are at the location, there is a television 120,140 at the location, etc. Some differences can include that there is a rug 118 at the initial incident scene 105 which is not present at the subsequent incident scene 125, the first subject 114 was aggressive at the initial incident scene 105, but the first subject 134 now appears scared, the second subject 116 was quiet at the initial incident scene 105, but the second subject is now crying, and that the television 120 was playing a sporting event, but is now displaying the news 140, there was a crying child 122 in the initial incident scene 105 that is now missing in the subsequent incident scene 125.

It should be understood that these limited numbers of similarities and differences are provided for ease of description. In an actual implementation, the incident context system 150 would be able to store hundreds, thousands, or even more details about an incident scene (e.g. half-filled glass of water on the table, position of couch cushions, etc.). What should be understood is that the number of items that could be potentially the same between incident scenes is far too great to be performed within the human mind, as the human mind would not be possible of processing the sheer number of items of information that could come from an incident scene.

The incident context system 150 may then prioritize the similarities and differences using the machine learning model. Initially, the machine learning model may identify the incident context (e.g. domestic violence request for service, etc.) and determine which items have been important in the past for this type of incident. For example, based on previous domestic violence types of incidents, it may be determined that the people present and their demeanor is important, distressed sounds (e.g. child crying 122), and what is playing on a television is important. The incident context system 150 may then send 185 this information to the subsequent responder 130.

Upon receipt of these similarities and differences, the subsequent responder 130 can tailor their investigation accordingly. For example, the subsequent responder 130 may try to determine why the first subject 134, who was previously aggressive, may now appear scared. The subsequent responder 130 may likewise investigate why the second subject 136 is now crying. The subsequent responder 130 may investigate what happened to the crying child 122. As should be clear, absent the techniques described herein, the subsequent responder 130 would not have been aware of the changes in demeanor of the two subjects or that there was a crying child previously present. Even if the subsequent responder 130 and the initial responder 110 were the same person, such details might not have been remembered due to the passage of time and the inherent frailties of the human mind.

In some cases, the prioritization from the incident context system 150 may be incorrect. For example, it may turn out that the content of what is being displayed on the television screen 120,140 is completely irrelevant in the context of a domestic violence request for service. Note, this does not mean that this particular item is always irrelevant, but rather just in this incident context. For example, in the context of a noise compliant involving people watching a sporting event on television, the particular contents of the television may be important.

In some cases, the prioritization may be incorrect and omit similarities and differences that are important. In the present example, the absence of the rug 118 was not considered a high priority item in the context of a domestic violence incident and was not sent to the subsequent responder 130. However, upon further investigation, the subsequent responder 130 may have found the rug 118 and noted it was hidden because it had blood stains on it. Thus, the absence of an item that is not normally movable (e.g. rug 118, etc.) may be considered important in the context of a domestic violence incident.

The subsequent responder 130 may then provide feedback 190 to the incident context system indicating which similarities and differences were useful, which were not, which were irrelevant, and what items turned out to be important. This feedback 190 may be used by the incident context system to update (e.g. retrain, etc.) the machine learning model 180 to provide better prioritization in future incidents with similar context. For example, in future domestic violence incidents, what is being displayed on a television may be given a lower priority and normally stationary items that are missing may be given a higher priority.

Figure 2:
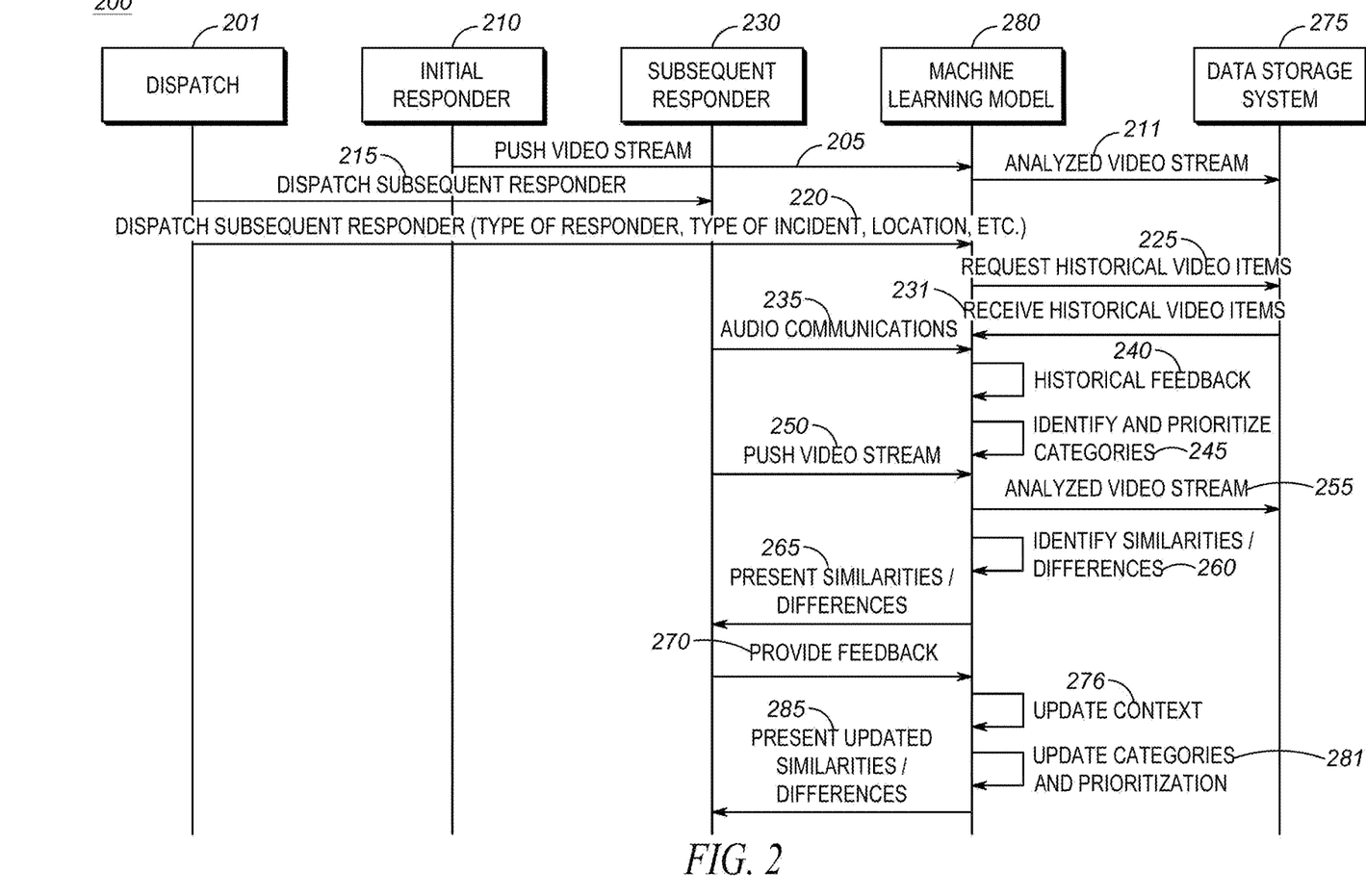
FIG. 2 is an example of a sequence diagram depicting an implementation of the techniques described herein.

FIG. 2 is an example of a sequence diagram 200 depicting an implementation of the techniques described herein. The sequence diagram 200 includes a dispatcher 201 that may be responsible for receiving requests for service and dispatching appropriate responders. There is also included an initial responder 210, which may be the same as the initial responder described with respect to FIG. 1. There is also included a subsequent responder 230, which may be the same as the subsequent responder 230 described with respect to FIG. 1. There is also included a machine learning model 280 and a data storage system 275. The machine learning model 280 and data storage system 275 may be the same as similarly numbered elements in FIG. 1 with respect to the incident context system 150 described above. Although not shown, it should be understood that the machine learning model 280 and storage system 275 are intended to encompass all the functionality of the incident context system 150 described with respect to FIG. 1.

The sequence begins with a push of a video stream 205 from the initial responder 210 to the machine learning model 280. The machine learning model 280 may process the video stream as described with respect to FIG. 1 and store results of the analyzed video stream 211 to the data storage system. For purposes of this example, assume this is the first time there has been a request for service at this location, and as such, there is no historical context to compare to.

At some later time, the dispatcher 201 may dispatch 215 a subsequent responder 230 to the same incident location. In additional to dispatching the subsequent responder 230, the dispatch system 201 may also send the dispatch request 220 to the machine learning model. The dispatch request sent to the machine learning model may include the type of responder that is being dispatched, the type of incident reported, the location, etc.

The machine learning model 280 may then request historical video items 225 from the data storage system 275. As explained with respect to FIG. 1, when the initial response occurs, and the video is analyzed, the information is stored in the data storage system 275 for use in later requests for service, such as the request for service related to dispatch 220. In response, the historical video items may be received 230 by the machine learning model 280 from the data storage system 275.

Audio communications 235 from the subsequent responder 230 may also be received by the machine learning model 280. The audio communications 235 may be useful in aiding the machine learning model's ability to understand the context of the current incident.

The historical feedback 240 may be processed by the machine learning model 280 to determine the context of the incident that is in progress, based on the information received from the dispatcher 201 and the audio communications, 235. In other words, the machine learning model 280 may determine the context of the ongoing incident based on this information.

Based on determining the context, the machine learning model 280 may identify and prioritize categories 245 that are relevant to the context of the current incident. As explained above, each incident context may have different elements that may be important, and those elements may be different based on the incident context. By identifying the incident context, the machine learning model 280 is able to determine which categories of elements are important for the specific incident context related to the dispatch 215, based on previous incidents with the same context.

The subsequent responder 230 may push a video stream 250 (e.g. from their body worn camera) to the machine learning model 280. As with respect to the initial responder 210, the machine learning model 280 may analyze the video stream and send the analyzed video stream 255 to the data storage system 275 for use in an later request for service at the same location.

In addition, the machine learning model 280 may identify similarities and differences 260 between the analyzed video stream 255 and the categories and elements stored in the data storage system 275. As described above, the prioritization that occurred in step 245 determines which similarities and differences are considered most important given the current incident context.

The similarities and differences may be presented 265 to the subsequent responder 230. As explained above, the similarities and differences may be presented as a simple list of items (e.g. rug missing, child crying, etc.) or as a suggestion for investigation (e.g. child was previously crying, consider investigating where child went, etc.).

In some implementations, the subsequent responder 280 may provide real-time feedback 270 as to if the identification and prioritization done by the machine learning model 280 was correct (e.g. incorrect context determined, etc.). If not, the machine learning model may update the context 276 and/or update the categories and prioritization 281. The same process that occurred before may repeat with the updated context and prioritization. The updated similarities/differences may be presented 285 to the subsequent responder 230. It should be noted that even if the feedback 270 is not received in real-time, it could be received at a later time and used to update the machine learning model 280 for the next incident.

Figure 3A:
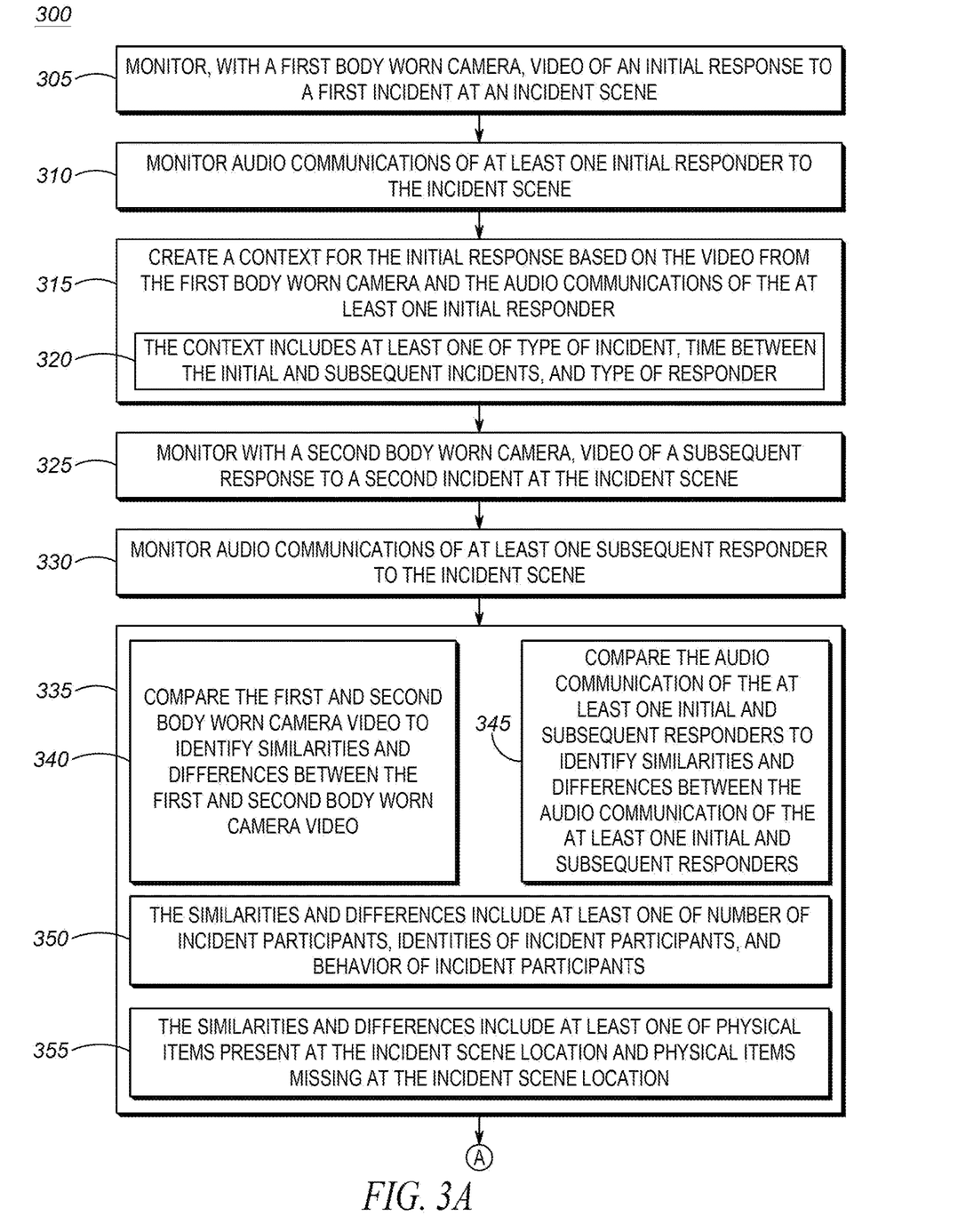
FIGS. 3A and 3B are an example of a flow diagram depicting an implementation of the techniques described herein.
Figure 3B:
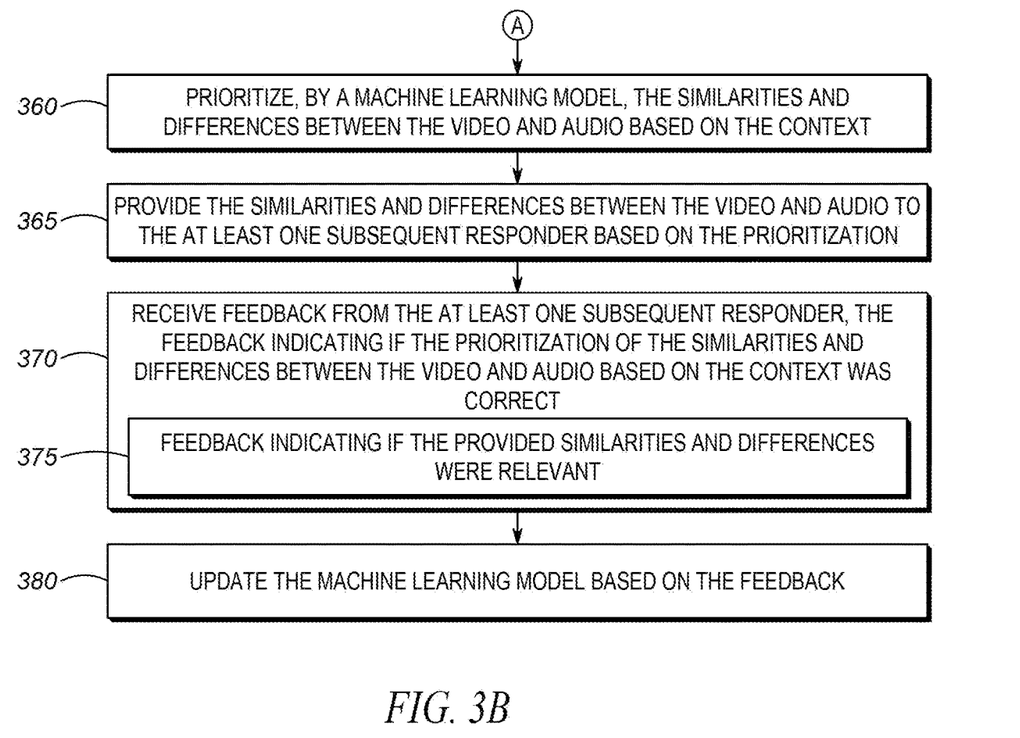

FIGS. 3A and 3B are an example of a flow diagram 300 depicting an implementation of the techniques described herein. In block 305, video of an initial response to a first incident at an incident scene may be monitored with a first body worn camera. For example, for an initial response to an indication, the initial responding officer may carry with them a video recording device, such as a body worn camera that is capable of capturing the incident. As explained above, the monitoring may occur at a system, such as the incident context system 150. Monitoring may include using the various analytics (e.g. object identification, person identification, behavior identification, etc.) to extract information that may be useful in developing an incident context. The extracted information may also be stored for use in identifying similarities and differences during a subsequent incident response.

In block 310, audio communications of at least one initial responder to the incident scene may be monitored. For example, the initial responder may carry an audio communications device, such as device 112. Any communications from the initial responder, or ambient noise detected at the incident scene may be captured and sent for analysis. Just as with the video, the analysis may be done by the incident context system 150. Again, the extracted information may be used for later identification of similarities and differences between incident responses.

In block 315, a context for the initial response based on the video from the first body worn camera and the audio communications of the at least one initial responder may be created. As shown in block 320, the context may include at least one of type of incident, time between the initial and subsequent incidents, and type of responder. The context of an incident includes details of the incident that may be useful across incidents occurring at different locations. For example, it is expected that the information that is important for a particular type of incident (e.g. domestic violence, etc.) would likely be important at other incidents of the same type. The context of an incident allows a response for a request for service to be compared to other similar requests for service, to identify the features that are the most important to highlight to a responding officer.

In block 325, video of a subsequent response to a second incident at the incident scene may be monitored with a second body worn camera. In other words, if a subsequent request for service is received at the same location as the request for service described above, the second body worn camera, which may be carried by a subsequent responder who is different than the initial responder, may perform essentially the same functions as described with respect to the first body worn camera as described with respect to block 305. Again, the extracted information may be stored by the incident context system 150.

In block 330, audio communications of at least one subsequent responder to the incident scene may be monitored. Again, just as in block 310, the monitoring may be implemented by the incident context system 150. The monitoring of the audio of the subsequent responder is essentially the same functionality as occurs with the monitoring of the audio communications of the initial responder.

Block 335 generally represents to the process of comparing the video and audio received from the initial and subsequent responses to identify similarities and differences. In block 340, the first and second body worn camera video may be compared to identify similarities and differences between the first and second body worn camera video. As explained above, monitoring the body worn camera video via an automated system, such as the incident context system 150, can identify incident scene details in a number greater than a human could keep track of. Any similarities and differences between the video from an initial response and a subsequent response maybe identified.

In block 345, the audio communication of the at least one initial and subsequent responders may be compared to identify similarities and differences between the audio communication of the at least one initial and subsequent responders. For example, the audio communications could include discussions amongst patrol members responding to the incident. For example, an incident may initially be classified and dispatched as a noise complaint, but upon arrival at the incident scene, it may be determined the incident is a domestic violence incident. Such information may be conveyed back to the dispatcher via a responders communications device. Accordingly, the context of the incident may change from a noise complaint to a domestic violence incident.

In block 350, the similarities and differences may include at least one of number of incident participants, identities of incident participants, and behavior of incident participants. As mentioned above, the number of elements that can be identified at an incident scene far surpass the ability of a human to note, and more importantly remember, them all. The number of participants, identifies of those participants, and behavior of those participants are just examples of traits related to people at the incident that may be stored.

In block 355, the similarities and differences may include at least one of physical items present at the incident scene location or physical items missing from the incident scene location. Just as in block 350, the number of items that can be identified and tracked by the incident context system 150 may far surpass the abilities of a human to identify and remember. Physical items present at a location (e.g. a rug, etc.) may be just as important as when those items are missing.

In block 360, a machine learning model may prioritize the similarities and differences between the video and audio based on the context. As explained above, based on the incident context different items may be more or less important. For example, in a domestic violence context, the demeanor of participants may be important, while in other incident types the presence or absence of physical items may be more important. Based on the context, the machine learning model may prioritize the similarities and differences between the initial response and a subsequent response to the same incident location.

In block 365, the similarities and differences between the video and audio may be provided to the at least one subsequent responder based on the prioritization. For example, the prioritization may include a list of hundreds, or thousands, of similarities and differences. The incident context system 150 may determine that a certain number (e.g. first 5, first 10, etc.) of these similarities and differences are to be provided to the responding officer. Because the prioritization was based on incident context, it is expected that the items that are more relevant to the incident, based on context, would be of higher priority.

In block 370, feedback from the at least one subsequent responder may be received. The feedback may indicate if the prioritization of the similarities and differences between the video and audio based on the context was correct. As described, the machine learning model 180 uses feedback from the responders to determine if the prioritization of items based on incident context type is correct. As time passes, the model would continuously improve based on this feedback. For example, useful items would be prioritized higher in the future, while less useful items would be prioritized lower. Block 375 is an example of feedback that indicates if the provided similarities and differences were relevant. In the above example, the show that was on the television was irrelevant, and the feedback may so indicate.

In block 380, the machine learning model may be updated based on the feedback. In general, machine learning models may utilize feedback to improve their capabilities. The feedback allows the machine learning model to be updated such that future uses of the model may be more accurate, providing similarities and differences that are more useful based on a particular incident context.

Figure 4:
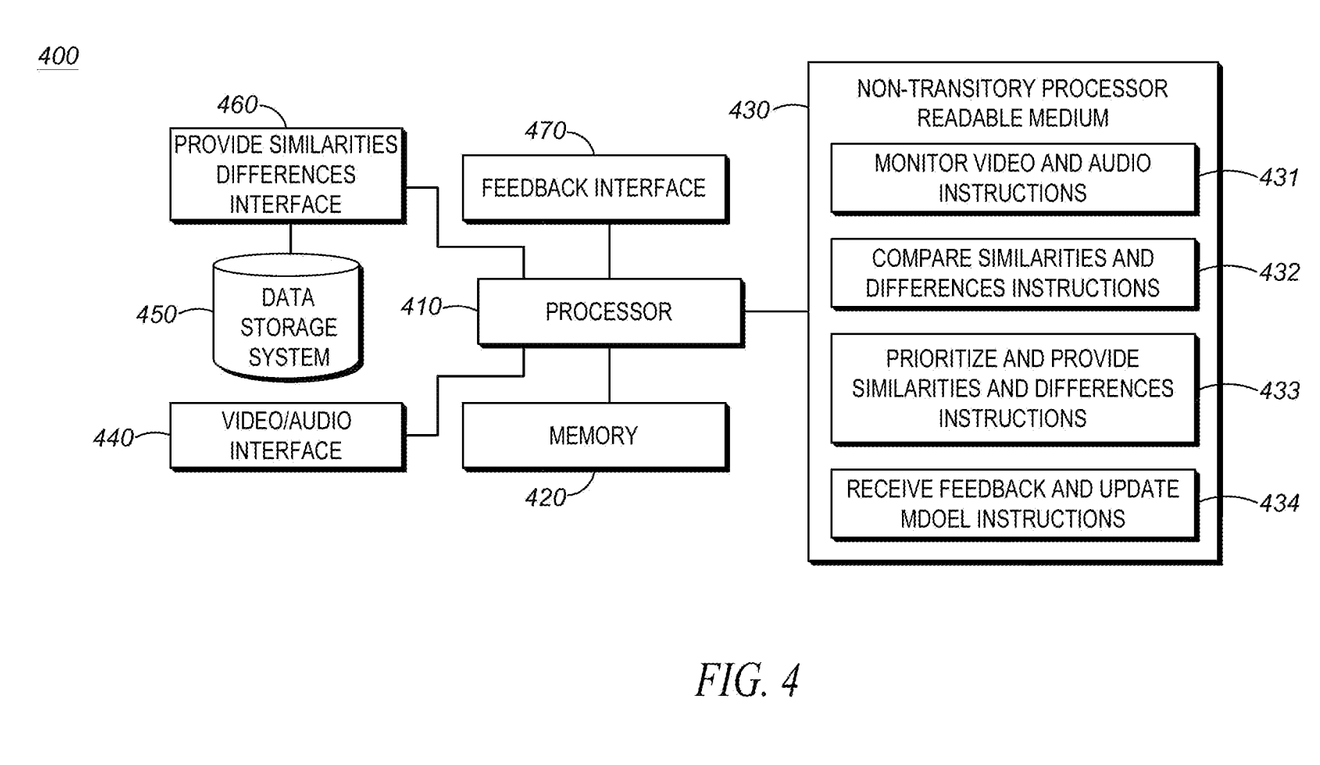
FIG. 4 is an example of a device that may implement the techniques described herein.

FIG. 4 is an example of a device 400 that may implement the prioritizing similarities and differences during responses to incidents based on incident context described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. video analytics, audio analytics, comparisons, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, video/audio interface 440, data storage system 450, provide similarities and differences interface 460, and feedback interface 470.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include monitor video and audio instructions 431. The monitor video and audio instructions 431 may cause the processor to monitor video and audio generated by an initial responder and a subsequent responder. For example, the video/audio interface 440 may be utilized to communicate with a body worn camera and/or audio communications device carried by the initial and subsequent responder. The video/audio interface may be a real-time interface, such as a wireless connection to the video and/or audio devices, or an offline connection, such as when the responder returns to the station.

The monitor video and audio instructions 431 can also include processing the video and/or audio with a device such as the incident context system 150 to extract context information as well as features/elements/items at the incident location. These extracted items may be stored in the data storage system 450. It should be understood that the monitor video and audio instructions 431 may include instructions to implement the object detection analytics, person identification analytics, and behavioral analytics, as well as any other analytics provided by the incident context system 150. The monitor video and audio instructions 431 are described throughout this description generally, including places such as the description of message sequences 205-220, 250, 255, and blocks 305-330.

The medium 430 may include compare similarities and differences instructions 432. The compare similarities and differences instructions 432 may cause the processor to utilize the machine learning model to compare similarities and differences between items captured from the video and audio sources via the video/audio interface 440 and stored in the data storage system 450. The compare similarities and differences instructions 432 are described throughout this description generally, including places such as the description of message sequences 225-240, 260, and blocks 335-355.

The medium 430 may include prioritize and provide similarities and differences instructions 433. The prioritize and provide similarities and differences instructions 433 may cause the processor to prioritize the similarities and differences found in the audio and video based on the context of the incident. As such the priorities may not be the same depending on the incident types. Once prioritized, the similarities and differences can be provided to the responding officer via the provide similarities and differences interface 460.

The provide similarities and difference interface 460 may utilize any techniques for communicating with the responding officer. For example, by providing the information over the officer communications device. Other mechanisms may include providing the information via a virtual realty headset, a text message, a virtual assistant response, etc. The prioritize and provide similarities and differences instructions 433 are described throughout this description generally, including places such as the description of message sequences 245, 265, 285 and blocks 360, and 365.

The medium 430 may include receive feedback and update model instructions 434. The receive feedback and update model instructions 434 may cause the processor to receive feedback from the responding officer indicating if the context selection and prioritization of similarities and differences was done correctly. The feedback may be received via the feedback interface 470. The feedback interface 470 may be any mechanism for communicating with the responding officer.

For example, the feedback mechanism may be receiving audio feedback via the responding officer communications device. It could also include receiving feedback via text message, through a virtual assistant, as input via a computer terminal, or any other mechanism. The feedback may then be used to update the machine learning model in order to provide improved context identification and prioritization for future incidents. The receive feedback and update model instructions 434 are described throughout this description generally, including places such as the description of message sequences 270-280 and blocks 370-380.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot identify, let alone keep track of, the vase number of similarities and differences between different incident response at the same location, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
monitoring, with a first body worn camera, video of an initial response to a first incident at an incident scene;
monitoring audio communications of at least one initial responder to the incident scene;

creating a context for the initial response based on the video from the first body worn camera and the audio communications of the at least one initial responder;
monitoring with a second body worn camera, video of a subsequent response to a second incident at the incident scene;
monitoring audio communications of at least one subsequent responder to the incident scene;
comparing the first and second body worn camera video to identify similarities and differences between the first and second body worn camera video;
comparing the audio communication of the at least one initial and subsequent responders to identify similarities and differences between the audio communication of the at least one initial and subsequent responders;
prioritizing, by a machine learning model, the similarities and differences between the video and audio based on the context; and
providing the similarities and differences between the video and audio to the at least one subsequent responder based on the prioritization.

2. The method of claim 1 further comprising:
receiving feedback from the at least one subsequent responder, the feedback indicating if the prioritization of the similarities and differences between the video and audio based on the context was correct; and
updating the machine learning model based on the feedback.

3. The method of claim 1 wherein the feedback further includes feedback indicating if the provided similarities and differences were relevant.

4. The method of claim 1 wherein the context includes at least one of type of incident, time between the initial and subsequent incidents, and type of responder.

5. The method of claim 1 wherein the similarities and differences include at least one of number of incident participants, identities of incident participants, and behavior of incident participants.

6. The method of claim 1 wherein the similarities and differences include at least one of physical items present at the incident scene and location of physical items at the incident scene.

7. The method of claim 1 wherein the first body worn camera and the second body worn camera are the same camera and the at least one initial responder and the at least one subsequent responder are the same responder.

8. A system comprising:
a processor; and
a memory coupled to the processor, the memory containing a set of instructions thereon that when executed by the processor cause the processor to:
monitor, with a first body worn camera, video of an initial response to a first incident at an incident scene;
monitor audio communications of at least one initial responder to the incident scene;
create a context for the initial response based on the video from the first body worn camera and the audio communications of the at least one initial responder;
monitor with a second body worn camera, video of a subsequent response to a second incident at the incident scene;
monitor audio communications of at least one subsequent responder to the incident scene;
compare the first and second body worn camera video to identify similarities and differences between the first and second body worn camera video;
compare the audio communication of the at least one initial and subsequent responders to identify similarities and differences between the audio communication of the at least one initial and subsequent responders;
prioritize, by a machine learning model, the similarities and differences between the video and audio based on the context; and
provide the similarities and differences between the video and audio to the at least one subsequent responder based on the prioritization.

9. The system of claim 8 further comprising instructions to:
receive feedback from the at least one subsequent responder, the feedback indicating if the prioritization of the similarities and differences between the video and audio based on the context was correct; and
update the machine learning model based on the feedback.

10. The system of claim 8 wherein the feedback further includes feedback indicating if the provided similarities and differences were relevant.

11. The system of claim 8 wherein the context includes at least one of type of incident, time between the initial and subsequent incidents, and type of responder.

12. The system of claim 8 wherein the similarities and differences include at least one of number of incident participants, identities of incident participants, and behavior of incident participants.

13. The system of claim 8 wherein the similarities and differences include at least one of physical items present at the incident scene and location of physical items at the incident scene.

14. The system of claim 8 wherein the first body worn camera and the second body worn camera are the same camera and the at least one initial responder and the at least one subsequent responder are the same responder.

15. A non-transitory processor readable medium containing a set of instructions thereon that when executed by a processor cause the processor to:
monitor, with a first body worn camera, video of an initial response to a first incident at an incident scene;
monitor audio communications of at least one initial responder to the incident scene;
create a context for the initial response based on the video from the first body worn camera and the audio communications of the at least one initial responder;
monitor with a second body worn camera, video of a subsequent response to a second incident at the incident scene;
monitor audio communications of at least one subsequent responder to the incident scene;
compare the first and second body worn camera video to identify similarities and differences between the first and second body worn camera video;
compare the audio communication of the at least one initial and subsequent responders to identify similarities and differences between the audio communication of the at least one initial and subsequent responders;
prioritize, by a machine learning model, the similarities and differences between the video and audio based on the context; and
provide the similarities and differences between the video and audio to the at least one subsequent responder based on the prioritization.

16. The medium of claim 15 further comprising instructions to:

receive feedback from the at least one subsequent responder, the feedback indicating if the prioritization of the similarities and differences between the video and audio based on the context was correct; and update the machine learning model based on the feedback.

17. The medium of claim 15 wherein the feedback further includes feedback indicating if the provided similarities and differences were relevant.

18. The medium of claim 15 wherein the context includes at least one of type of incident, time between the initial and subsequent incidents, and type of responder.

19. The medium of claim 15 wherein the similarities and differences include at least one of number of incident participants, identities of incident participants, and behavior of incident participants.

20. The medium of claim 15 wherein the similarities and differences include at least one of physical items present at the incident scene and location of physical items at the incident scene.

* * * * *